US009449169B2

(12) United States Patent
Laplace et al.

(10) Patent No.: US 9,449,169 B2
(45) Date of Patent: Sep. 20, 2016

(54) BLOCK STORAGE VIRTUALIZATION ON COMMODITY SECURE DIGITAL CARDS

(75) Inventors: Cyprien Laplace, Grenoble (FR); Harvey Tuch, Cambridge, MA (US); Kenneth Charles Barr, Newton, MA (US); Craig Farley Newell, Cambridge, MA (US); Bi Wu, Durham, NC (US); Viktor Gyuris, Newton, MA (US)

(73) Assignee: VMware, Inc., Palo Alto, CA (US)

( * ) Notice: Subject to any disclaimer, the term of this patent is extended or adjusted under 35 U.S.C. 154(b) by 416 days.

(21) Appl. No.: 13/430,175

(22) Filed: Mar. 26, 2012

(65) Prior Publication Data

US 2013/0254459 A1    Sep. 26, 2013

(51) Int. Cl.
G06F 12/02    (2006.01)
G06F 11/14    (2006.01)
G06F 21/53    (2013.01)
G06F 9/455    (2006.01)
G06F 21/64    (2013.01)
G06F 17/30    (2006.01)

(52) U.S. Cl.
CPC ........... *G06F 21/53* (2013.01); *G06F 9/45533* (2013.01); *G06F 11/1435* (2013.01); *G06F 17/30218* (2013.01); *G06F 21/64* (2013.01); *G06F 12/0246* (2013.01); *G06F 17/30185* (2013.01); *G06F 17/30233* (2013.01); *G06F 2212/7207* (2013.01); *G06F 2221/2151* (2013.01)

(58) Field of Classification Search
CPC ..................... G06F 17/30218; G06F 11/1068; G06F 11/1435; G06F 12/0246; G06F 12/0866; G06F 17/30233; G06F 17/30185; G06F 21/53; G06F 21/64; G06F 9/45533; G06F 2221/2151; G06F 2212/7207
See application file for complete search history.

(56) References Cited

U.S. PATENT DOCUMENTS

| 2006/0155931 | A1* | 7/2006 | Birrell et al. ................. 711/115 |
| 2007/0143286 | A1* | 6/2007 | Kim .................... G06F 17/3012 |
| 2008/0075279 | A1* | 3/2008 | Yoon et al. ..................... 380/44 |
| 2009/0248887 | A1* | 10/2009 | Craft et al. .................... 709/231 |
| 2010/0082547 | A1* | 4/2010 | Mace et al. ................... 707/648 |
| 2012/0166709 | A1* | 6/2012 | Chun ............................ 711/103 |
| 2012/0265792 | A1* | 10/2012 | Salters .................... G01C 21/26 707/822 |
| 2013/0013561 | A1* | 1/2013 | Chan et al. ................... 707/636 |

FOREIGN PATENT DOCUMENTS

WO    WO 2011026660 A1 *    3/2011

OTHER PUBLICATIONS

Atsuo Kawaguchi, Shingo Nishioka, Hiroshi Motoda, "A flash-memory based file system" (1995). Advanced Research Laboratory, Hitachi, Ltd.*

(Continued)

*Primary Examiner* — David X Yi
*Assistant Examiner* — Rocio Del Mar Perez-Velez (57) ABSTRACT

One embodiment of the present invention provides a system that facilitates storing an image file of a virtual machine on a potentially unprotected flash storage exhibiting sub-optimal non-sequential write performance on a mobile phone. During operation, the system stores in the flash storage data in a log-structured format and in a protected storage meta-data associated with the data stored in the flash storage. The system also checks integrity of the data stored in the flash storage using the meta-data in the protected storage.

34 Claims, 9 Drawing Sheets

(56) References Cited

OTHER PUBLICATIONS

Harvey Tuch, Cyprien Laplace, Kenneth C. Barr, Bi Wu "Block Storage Virtualization with Commodity Secure Digital Cards" VEE'12 Mar. 3-4, 2012, London, England, UK.*

Rosenblum, Mendel "The Design and Implementation of a Log-Structured File System" Electrical Engineering and Computer Sciences, Computer Science Division, University of California, Berkeley, CA 94720, Jul. 24, 1991, pp. 1-15, US.

* cited by examiner

BLOCK STORAGE VIRTUALIZATION ON COMMODITY SECURE DIGITAL CARDS

BACKGROUND

Over the past decade the mobile phone has evolved from a voice-centric device into a mobile personal computer. No longer just for telephony, the mobile phone has become a multitasking tool, useful for activities such as emailing and web browsing. The current trends for mobile phones are toward the mimicking of desktop functionality. As a result, mobile devices are becoming enterprise endpoints with rich applications and core enterprise connectivity. Because an enterprise may need to specifically provision a mobile device for accessing restricted data, an employee may either have to sacrifice a personal device or carry two devices, one personal and one enterprise, to work.

From an end-user perspective, it is desirable to consolidate a personal mobile device with an enterprise device. Virtualization offers an opportunity to provide a convenient solution by preserving isolation of environments without requiring a second physical enterprise device. Co-existing virtual phones on a personal mobile phone represents a very attractive alternative to existing solutions involving multiple physical mobile phones. The rapid pace of hardware advances in mobile devices over the past several years has led to a class of mobile phones with resources capable of supporting multiple virtual phones where the virtualization overhead is small.

Many mobile platforms are often equipped with flash storage devices exhibiting sub-optimal non-sequential write performance (relative to sequential writes on that device), such as Secure Digital (SD) cards, embedded SD (eSD) cards, or embedded MultiMediaCard (eMMC). The image and checkpoint files for a virtual mobile phone may reside in these storage devices due to their large size. However, these storage devices are designed as a low-cost storage solution and are optimized for media files, such as photos, audio, and video files. As a result, these storage devices do not perform well with non-sequential write operations, which are typical of a virtual phone. Furthermore, flash storage devices such as SD cards typically have the File Allocation Table (FAT) file system for interoperability purposes. However, the FAT file system allows applications to write in the storage without restriction, leading to weak security and reduced robustness, that is, the storage is unprotected. As a result, malicious host applications running alongside the virtual mobile phone can arbitrarily access and modify the virtual phone image and checkpoint files. Unprotected storage is also exposed when a mobile platform is connected to a computer via a USB cable when in mass storage mode. In addition, host crashes or battery failures can cause the virtual phone image and checkpoint files to become corrupt.

While flash storage devices such as SD/eSD/eMMC bring many desirable features to mobile virtualization, some issues remain unsolved regarding performance, security, and robustness when a virtual mobile phone image and checkpoint files are stored in an SD/eSD/eMMC card. In this disclosure, the term "SD card" is used in a generic sense and can refer to any flash storage devices which has sub-optimal non-sequential write performance and which can be potentially unprotected.

SUMMARY

One embodiment of the present invention provides a system that facilitates storing an image file of a virtual machine in potentially unprotected flash storage exhibiting sub-optimal non-sequential write performance. During operation, the system stores data in the flash storage in a log-structured format. The system further stores in a protected storage meta-data associated with the data stored in the flash storage. In addition, the system checks integrity of the data stored in the flash storage using the meta-data in the protected storage.

In a variation on this embodiment, the system is a mobile device.

In a variation on this embodiment, the data stored in the flash storage contains an image of a virtual machine.

In a variation on this embodiment, the flash storage and the protected storage are on the same storage device, wherein the storage device has a secure file system.

In a variation on this embodiment, the flash storage is a Secure Digital (SD) card.

In a variation on this embodiment, the system stores in a write buffer write data to be written in the flash storage.

In a variation on this embodiment, the system further calculates a checksum based on data in a memory block in the flash storage and stores the checksum in the meta-data associated with the memory block.

In a further variation on this embodiment, the checksum is calculated based on unencrypted data.

In a variation on this embodiment, the system also associates a timestamp with a write operation on a memory block in the flash storage and stores the timestamp in the meta-data associated with the memory block.

In a variation on this embodiment, the system also encrypts a memory block in the flash storage.

In a variation on this embodiment, the system appends new meta-data to the existing meta-data in a contiguous fashion.

In a variation on this embodiment, the system stores the data in the flash storage in one or more clusters, a respective cluster comprising a predetermined number of memory blocks.

In a further variation on this embodiment, the system also removes stale meta-data from the protected storage in response to the meta-data reaching a predetermined length or the data in the flash storage corresponding to the meta-data being opened.

In a further variation on this embodiment, the system frees a memory cluster in the flash storage, wherein the cluster is selected based on one or more of the following: 1) the cluster being marked as unused in its associated meta-data; 2) a number of available memory blocks in the cluster; 3) availability of an adjacent, writable memory cluster; 4) a write operation occurring in a previous memory cluster; and 5) a high number of unavailable memory blocks in the memory cluster compared with a plurality of nearby memory clusters.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of ensuring performance, security, and robustness for storing a virtual mobile phone image and checkpoint files on an SD card of a mobile phone is solved by storing data in contiguous memory blocks in a log-structured manner in the SD card and the corresponding meta-data in the protected storage (i.e., a storage with a secure file system, such as ext3) of the phone. In some embodiments, a protected storage can be an internal or native NOT AND (NAND) gate based memory chip with a secure file system. In some further embodiments, a protected storage can be an eMMC or an eSD device with a secure file system. Typical input/output (I/O) operations on a virtual device storage, which is included in a virtual machine image file, are mixed, and may require non-sequential access to different memory blocks of a flash storage device exhibiting sub-optimal non-sequential write performance. However, because such storage devices are designed as a low-cost storage solution and are optimized for media files, these storage devices do not perform well with non-sequential write operations. In some embodiments, the virtual phone image and checkpoint files are stored in the flash storage device exhibiting sub-optimal non-sequential write performance in a log-structured manner such that the I/O operations on the image are performed on contiguous memory blocks. A predetermined number of adjacent memory blocks are grouped into a cluster, and one cluster is made available at a time for I/O operations. As a result, contiguous memory blocks of the cluster become available for I/O operations, resulting in improved memory throughput.

In some embodiments, meta-data corresponding to the data in the unprotected storage are stored in a protected storage of the mobile phone. The data in the unprotected storage can be encrypted. Furthermore, a checksum can be computed on unencrypted data from a memory block and stored in the corresponding meta-data. A timestamp can also be associated with each write operation performed to a memory block and stored in the corresponding meta-data. The checksum and timestamp associated with each memory block facilitate data verification and protect the data against security threats as well as media failures.

In this disclosure, the phrase "flash storage device which exhibits sub-optimal non-sequential write performance" is used in a generic sense. This phrase and its various equivalent forms such as "flash storage" can refer to any type of storage device, including, but not limited to, SD cards, embedded SD (eSD) cards, micro-SD cards, mini-SD cards, SD high capacity (SDHC) cards, multimedia cards (MMCs), and embedded MMCs (eMMCs). Note that the aforementioned flash storage can be potentially unprotected. Furthermore, although examples in this disclosure use SD cards as the flash storage device, embodiments of the present invention are not limited to SD cards. Any flash storage device exhibiting sub-optimal non-sequential write performance, which may be protected or unprotected, can be used in various embodiments.

The term "virtual mobile phone" is used in a generic sense and the term refers to a logical device, or a "virtual machine," running on a physical device. The terms "mobile phone," "mobile system," and "mobile device" are used interchangeably in this disclosure. The terms "virtual" and "logical" are also used interchangeably in this disclosure.

The term "checkpoint" is used in a generic sense. Any method for supporting a suspend or a resume operation, and reducing boot time for a virtual machine can be used to provide a checkpoint. Furthermore, any method used to capture a snapshot of the current state of a device, and later on used for restarting the execution in case of failure, can also be used to provide a checkpoint. The term "image" is also used in a generic sense and may refer to a logical representation of a virtual device, which can be stored as a data file.

In this disclosure, data associated with a virtual mobile phone may refer to any stored data, including, but not limited to, images and checkpoints of the virtual phone. Meta-data associated with a virtual mobile phone refers to any data that provides information about one or more aspects of data associated with the virtual mobile phone.

Although the present disclosure is presented using examples of mobile phones, embodiments of the present invention are not limited to mobile devices. Embodiments of the present invention are applicable to any type of computing device, including but not limited to, desktop computers, notebook computers, netbook computers, tablets, portable multimedia players, etc.

Mobile Virtualization Platform

Figure 1:
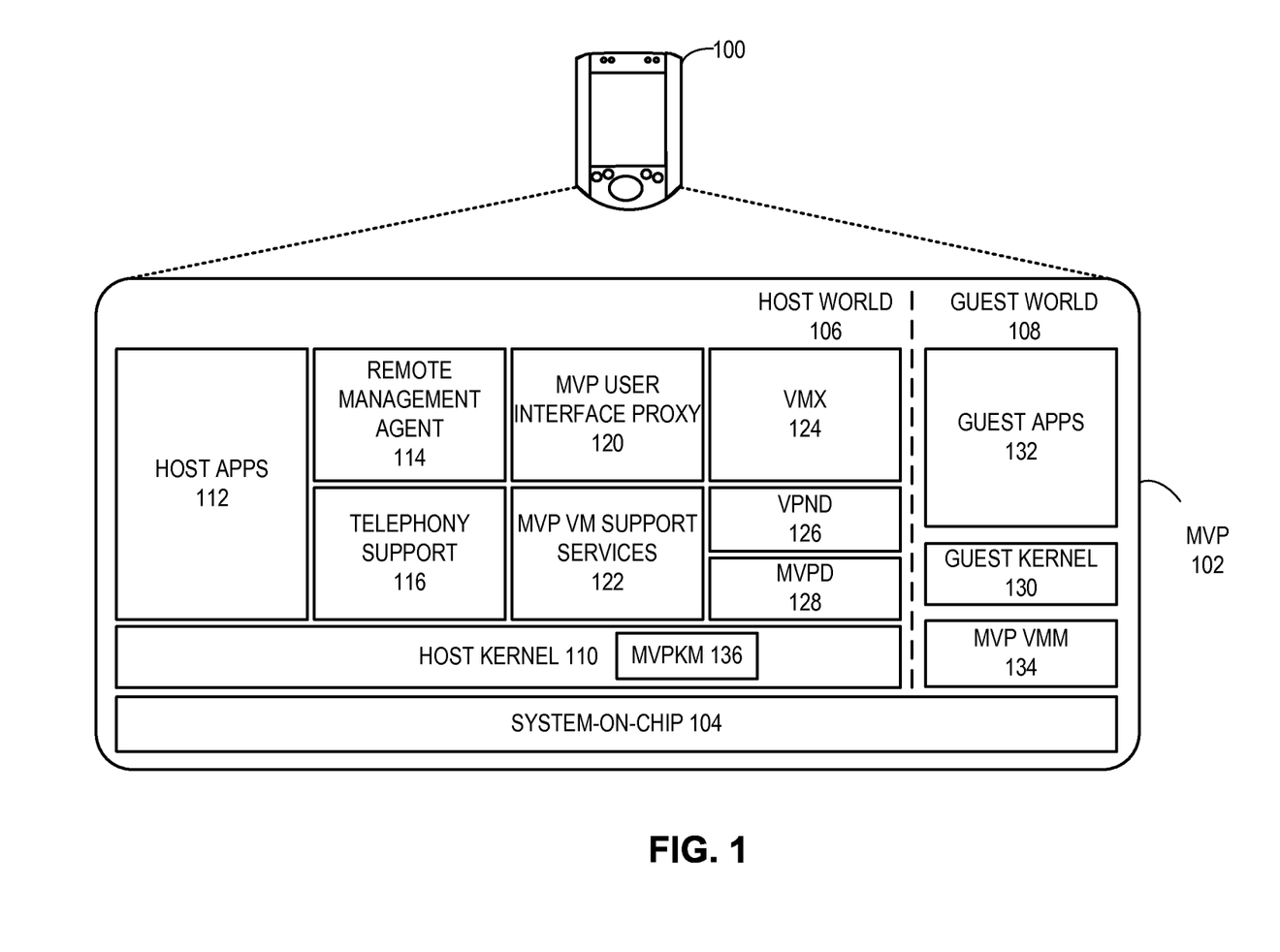
FIG. 1 illustrates an exemplary system architecture for mobile virtualization platform (MVP), in accordance with an embodiment of the present invention.

FIG. 1 illustrates an exemplary system architecture for mobile virtualization platform (MVP), in accordance with an embodiment of the present invention. MVP is an end-to-end solution for enterprise management of employee-owned phones, encompassing an enterprise virtual mobile phone for physical mobile devices. A physical mobile phone 100 in FIG. 1 includes MVP 102. MVP 102 is typically hosted in a system-on-chip (SoC) 104. The native operating system on phone 100 runs host kernel 110 over SoC 104. Host applications 112 run on host kernel 110. Host applications 112 can include personal applications of the owner of phone 100. Telephony support 116 allows phone 100 to make regular telephone calls. Host kernel 110 and all modules running on host kernel 110 form a "host world" 106. Host world 106 includes the user and system context, such as user files, privileged register files, and processor states.

In some embodiments, MVP 102 includes remote management agent 114 that allows the virtual mobile phone to be remotely managed. Remote management agent 114 can support provisioning, updating, wiping, locking and backup of virtual phones over mobile networks. In some embodiments, MVP 102 can run a guest operating system for a virtual mobile phone alongside the native operating system. The guest operating system includes a guest kernel 130 which runs guest applications 132. Guest applications 132 include all applications associated with the enterprise, which provides MVP for the phone. Guest kernel 130 and all modules running on guest kernel 130 form a "guest world" 108.

MVP user interface proxy 120 runs on the native operating system (i.e., host kernel 110) and provides the user interface to access the virtual mobile phone. When the virtual mobile phone in MVP 102 is loaded, proxy 120 allows the user interface of the guest operating system to operate. For example, the host operating system of phone 100 can be Symbian while the guest operating system of the virtual mobile phone can be Android. Under such a scenario, proxy 120 of MVP 102 runs on Symbian and allows the user interface of Android to operate when the virtual mobile phone is loaded in phone 100. MVP virtual machine (VM) support services 122 provide necessary host services to the virtual phone.

MVP relies on the ability of certain components to operate in privileged modes over a native operating system. A daemon process, MVP daemon (MVPD) 128 executes as a privileged user on the host and is responsible for granting necessary capabilities to MVP-related processes. In some embodiments, MVPD 128 is placed on phone 100 by an original equipment manufacturer. MVPD 128 performs integrity checks that enable a verified execution environment for the virtual phone of MVP 102. In addition, MVPD 128 inserts an authenticated MVP kernel module (MVPKM) 136 into host kernel 110, and facilitates transfer of control between host kernel 110 and MVP virtual machine monitor (VMM) 134.

During operation, when the virtual phone is launched, MVPD 128 loads VMM 134 into memory, and dedicates a thread to the execution of VMM 134. From the host operating system's point of view, this thread for VMM 134 represents the time spent running the virtual phone, and the processor time is divided between guest world 108 and host world 106. In host world 106, host kernel 110 and applications 112 continue to execute as before. When guest world 108 is started, MVPD 128 calls MVPKM 136, which facilitates the switch between the worlds. The control of phone 100 is then transferred to VMM 134, which in turn passes control to guest kernel 130. VMM 134 returns control to host world 106 on interrupts and when necessary to access host services, such as host memory allocation or making system calls on behalf of the virtual phone.

VMM 134 works with components on host world 106, such as VMX process 124 to provide guest world 108 with a set of virtual devices, such as storage. MVP 102 introduces a paravirtualized guest driver for each such virtual device component. VMM 134 intercepts calls from guest drivers and forwards requests as needed to the components for device-specific behavior. MVP 102 also facilitates checkpointing and restoration of the virtual phone, providing an enhanced user experience via virtual phone persistence, and hides the virtual phone boot process.

Logging Block Store

Because storing the virtual phone image and checkpoint files requires a large amount of storage space, MVP may store them in potentially unprotected flash storage devices exhibiting sub-optimal non-sequential write performance. In some embodiments, such storage devices are external storage cards and can be inserted into a physical phone. However, storing in a potentially unprotected flash storage device exhibiting sub-optimal non-sequential write performance (e.g., an SD card) may lead to performance, security, and reliability issues. Embodiments of the present invention use a logging block store (LBS) file format to resolve these issues. The LBS is a type of log-structured system, which writes all modifications to a storage device sequentially in a log-like structure, thereby speeding up both write operations and crash recovery. Along with the log the system also stores associated metadata, which includes indexing information, so that files can be read back from the log efficiently. In addition, the system performs garbage collection to re-use storage space, which prevents the log file from growing infinitely. More details about log-structured file systems in general can be found in Rosenblum, Mendel and Ousterhout, John K. "The Design and Implementation of a Log-Structured File System," ACM Transactions on Computer Systems, Vol. 10 Issue 1. pp. 26-52, February 1992, which is incorporated by reference herein.

Figure 2:
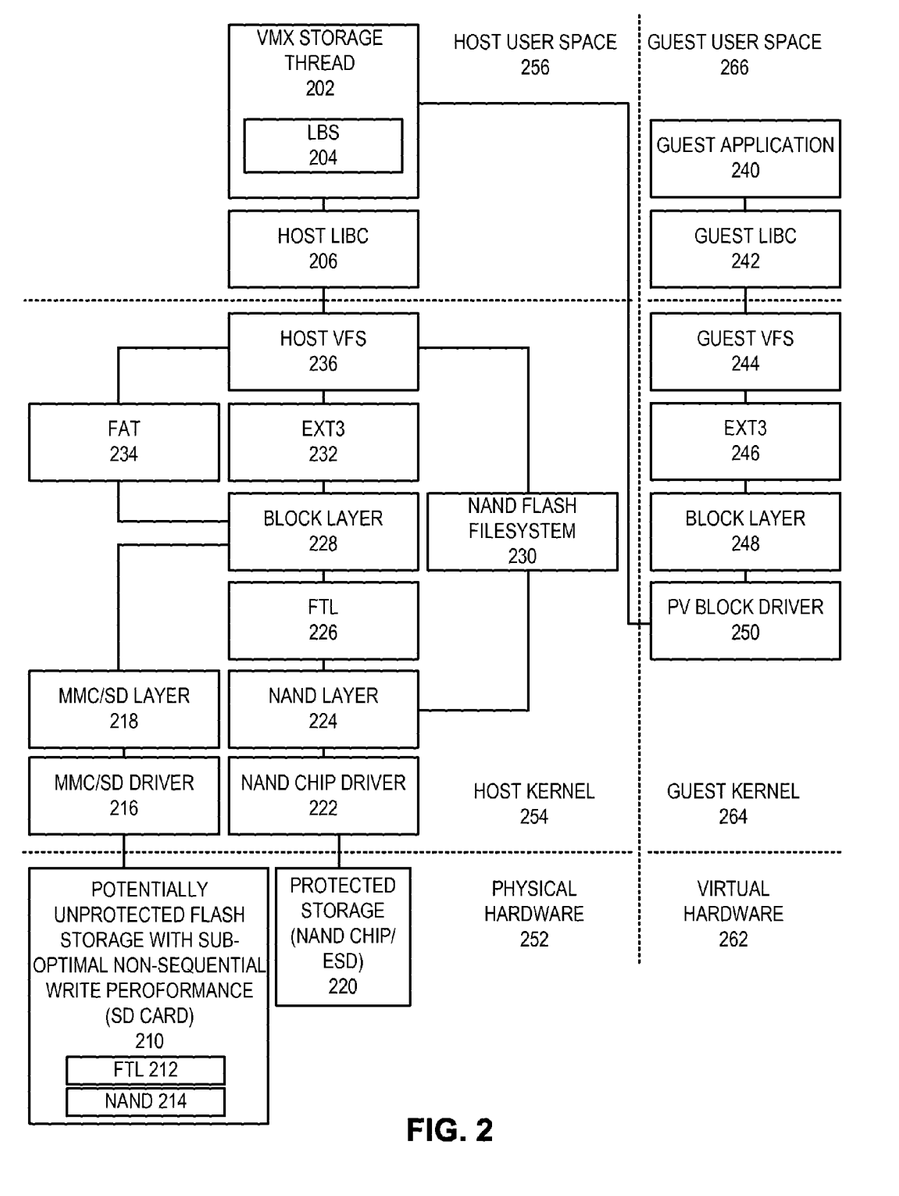
FIG. 2 illustrates an exemplary storage architecture for MVP, in accordance with an embodiment of the present invention.

FIG. 2 illustrates an exemplary storage architecture for MVP, in accordance with an embodiment of the present invention. In some embodiments, physical hardware 252 of a phone with MVP offers two types of storage devices: a potentially unprotected flash storage device exhibiting sub-optimal non-sequential write performance, such as an SD card 210 and protected storage 220. SD card 210 contains a flash translation layer (FTL) 212 which makes flash memory of SD card 210 appear to the phone as a linearly accessible block storage device. The flash memory of SD card 210 includes arrays of NAND gates 214, which are organized by FTL 212 into a logical block structure. Protected storage 220 is constructed with NAND gates as well.

In some embodiments, host kernel 254 of the host operating system has a NAND flash file system 230 that is used to access protected storage 220. In some embodiments, host kernel 254 has a generic file system, such as ext3, wherein FTL 226 makes storage 220 appear to the phone as a linearly accessible block storage device and the secure file system makes the storage protected. Host virtual file system (VFS) 236 of host kernel 254 allows host libraries to access different types of file systems in a uniform way. In some embodiments, the file system for SD card 210 is FAT (234) and for protected storage 220 is ext3 (232). In some embodiments, protected storage 220 can be an eMMC or an eSD card with a secured file system, such as ext3 (232). In addition, host libraries can include a C language library, such as host libc 206. FTL 226 makes linear flash memory of NAND layer 224 appear to block layer 228 like a disk drive. Block layer 228 includes a request queue and allows I/O operations on protected storage 220 as memory blocks. A driver 222 for the NAND chip in protected storage 220 executes the I/O operations on NAND chip based on activities in NAND layer 224. Similarly, in conjunction with FTL 212, block layer 228 allows I/O operations on SD card 210 as memory blocks via MMC/SD layer 218. A driver 216 for the MMC/SD card executes the I/O operations on SD card 210 based on activities in MMC/SD layer 218.

Guest kernel 264 contains a paravirtualized block storage driver 250, providing the front-end of the virtual phone. Driver 250 provides guest kernel 264 a set of virtual hardware 262 and communicates requests of block layer 248 in kernel 264 with VMX storage thread 202 executing in host user space 256. VMX thread 202 implements LBS 204 for the virtual phone. Guest virtual file system (VFS) 244 of guest kernel 264 allows guest libraries, such as guest libc 242, to access a guest file system in guest user space 266 in a uniform way. In some embodiments, the guest file system is an ext3 file system 246.

A read or write operation by a guest application 240 requires data to be transferred between guest application memory and the physical SD card media. For example, during a write operation, the corresponding data is transferred to guest kernel 264. A virtual I/O operation is then started by a call from a paravirtualized device driver. The driver provides a reference to a VMM, as described in conjunction with FIG. 1. The VMM, in turn, provides a shared mapping to VMX thread 202. The block, as identified by block layer 228, is then written to the virtual phone image file using a write operation on host kernel 254 and transferred to SD card 210.

A simple FTL, typically found on an SD card, is optimized for sequential write patterns and coarse block operations on the SD card. In embodiments of the present invention, the LBS is a log structured file format designed to represent virtual phone images at the fine block granularity. The log structure bridges the gap between demands associated with the non-sequential I/O access pattern of a virtual phone and the SD card's reduced throughput caused by non-sequential access patterns. The LBS groups a predetermined number of memory blocks on the SD card into memory clusters to facilitate efficient garbage collection. An LBS-based image for a virtual phone includes a data file and a meta-data file. The data file is located on the SD card due to its significant size. The meta-data file is located in the phone's protected storage, since it is a fraction of the size of its data counterpart, and hence benefits from security and robustness of the protected storage.

Figure 3A:
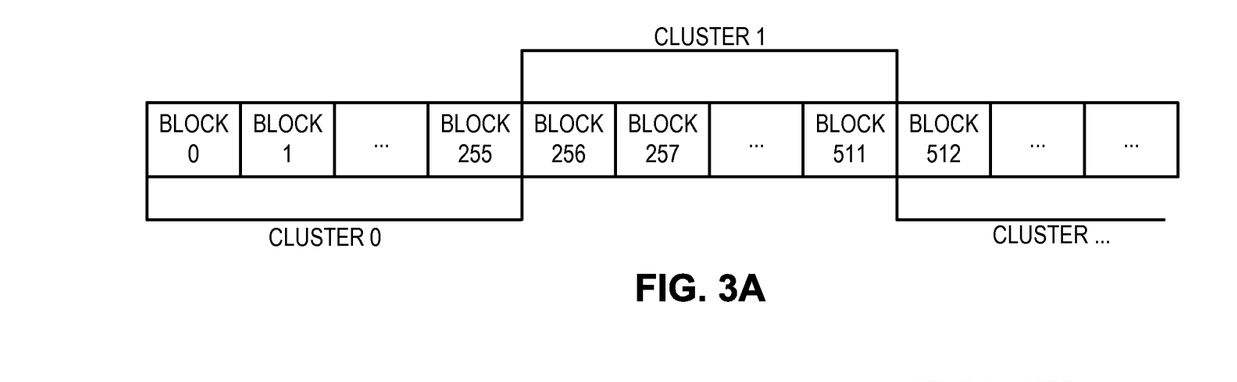
FIG. 3A illustrates exemplary cluster formation of a logging block structure (LBS) data file format, in accordance with an embodiment of the present invention.

In some embodiments, the LBS data file is stored in fixed size clusters, each of which includes a number of fixed sized blocks. FIG. 3A illustrates exemplary cluster formation of a logging block structure (LBS) data file format, in accordance with an embodiment of the present invention. In this example, blocks 0 to 255 are grouped into cluster 0, blocks 256 to 511 are grouped into cluster 1, and so forth. In some embodiments, the size of a block is 1 kilobyte and a cluster is 256 kilobytes. Clusters are created for making memory available for contiguous write operations (particularly after garbage collection). For instance, assume that cluster 1 becomes available during operation. Consequently, blocks 256 to 511 become available for contiguous write operations. If a guest application on a virtual phone starts a write operation, then 256 contiguous blocks of memory are available for writing. In other words, clusters facilitate garbage collection and ensure that contiguous sequential blocks exist to speed up write operations. The block indices in the data file (e.g., block 0, block 1, and so forth) are referred to as the physical block number (PBN). The logical block number (LBN) refers to the index of a block represented via LBS inside the virtual phone image. A page mapping table is maintained for LBS in the VMX thread to translate between LBN and PBN. The LBS data file is fully allocated on the storage device at creation, preventing further fragmentation once initialized.

Figure 3B:
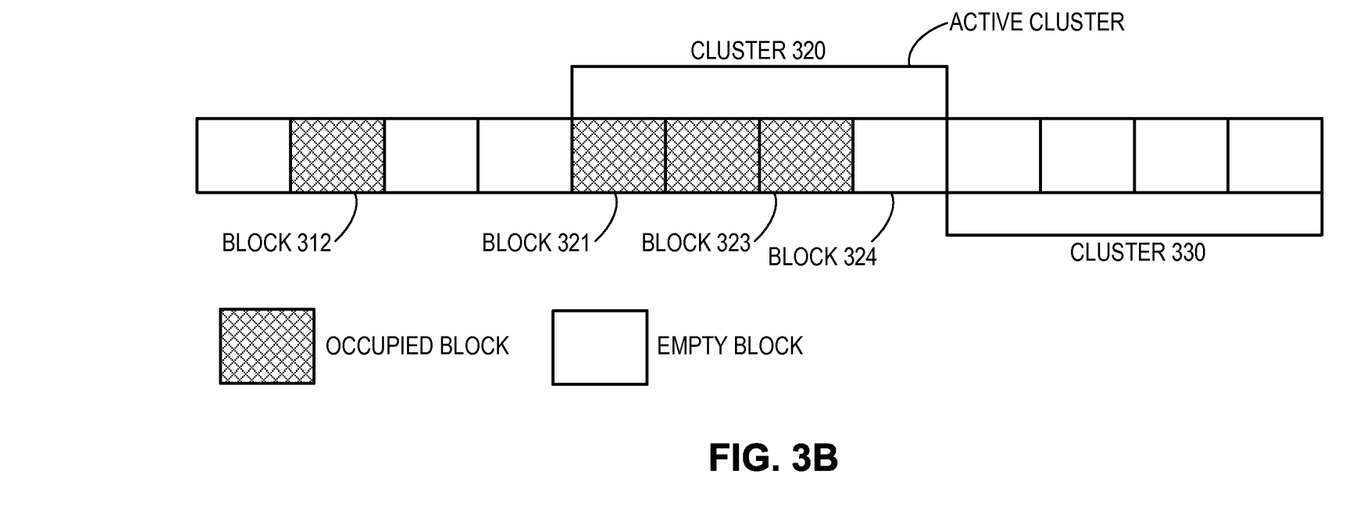
FIG. 3B illustrates exemplary storage occupancy for the LBS data file format, in accordance with an embodiment of the present invention.

FIG. 3B illustrates exemplary storage occupancy for the LBS data file format, in accordance with an embodiment of the present invention. An active cluster is the cluster in the storage where current write operations take place. All write operations always append to the end of the current active cluster. In the example in FIG. 3B, during operation, a cluster 320 becomes active. Consequently, all write operations of MVP take place in cluster 320 starting from block 321. Assume that blocks 321 to 323 become occupied. Consequently, the next write operation takes place in block 324. A garbage collector maintains a pool of free clusters to provide when the active cluster is full. When cluster 320 becomes full, the garbage collector offers cluster 330 as an active cluster.

For a read operation from a guest application on the virtual phone, the LBN is first mapped to the current PBN for the logical block using the page mapping table. Then the physical block corresponding to the PBN from the storage is read. For instance, the PBN of block 312 in FIG. 3B becomes the current PBN during operation and the read operation reads from block 312. After the read operation, the data from block 312 is cached by both the guest kernel and the host kernel. In some embodiments, to avoid this double caching, the VMX thread uses a flag. By setting the flag, the VMX thread instructs the host kernel to avoid using its page cache for this file. In some embodiments, the data file is over-provisioned with space, e.g. the number of physical blocks allocated might be larger than the number of logical blocks. This over-provisioning ensures that even a full virtual phone image maintains adequate space for freeing memory clusters.

Figure 4:
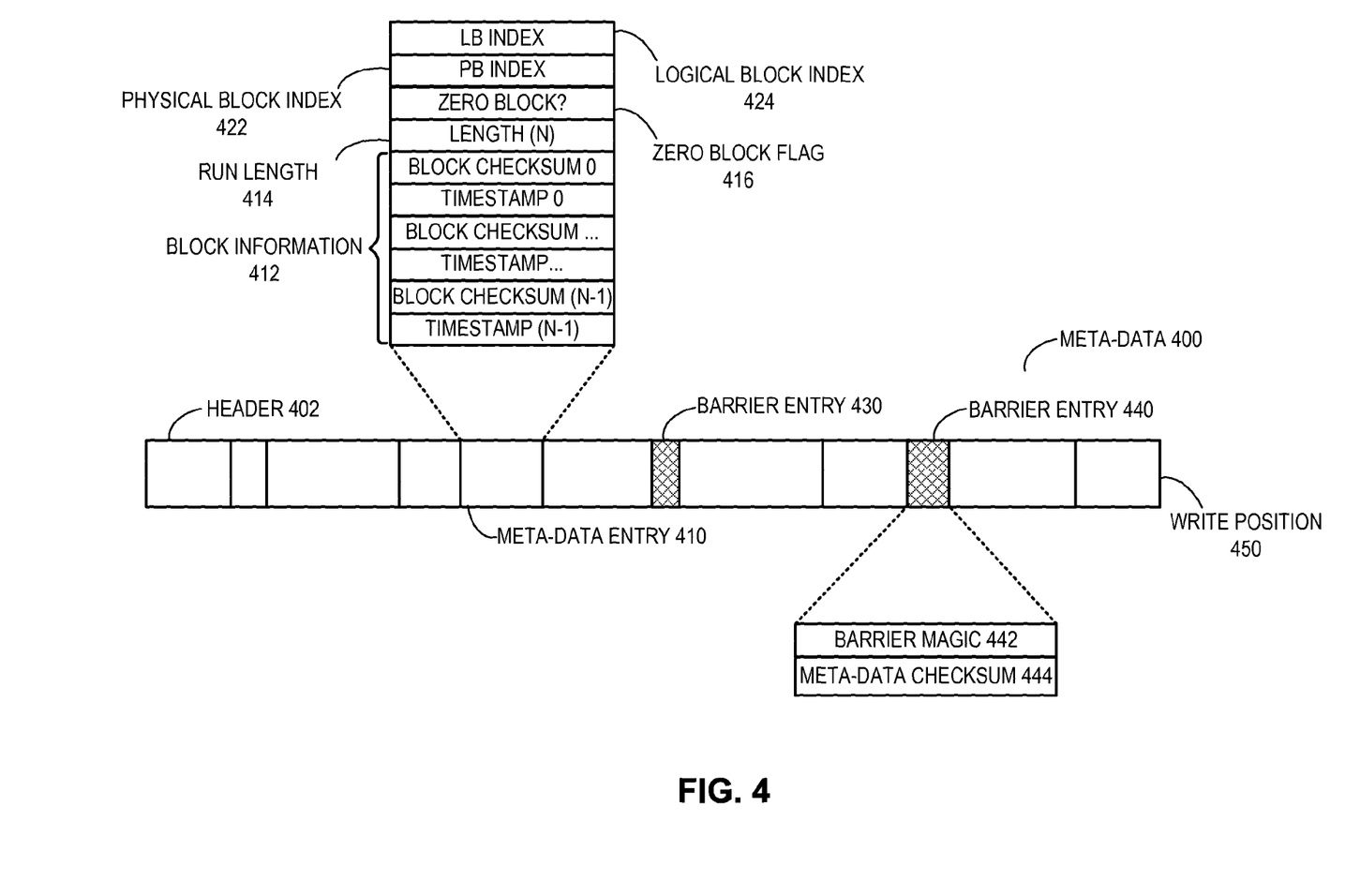
FIG. 4 illustrates an exemplary LBS meta-data file format of MVP, in accordance with an embodiment of the present invention.

FIG. 4 illustrates an exemplary LBS meta-data file format of MVP, in accordance with an embodiment of the present invention. In this example, a LBS meta-data file 400 resides in the protected storage and is an append-only log of meta-data associated with data stored in a potentially unprotected flash storage device exhibiting sub-optimal non-sequential write performance (e.g., SD card) and the corresponding barrier entries. (Note that a barrier entry is a special I/O operation used in a pipelined system to ensure the proper ordering of other I/O operations placed before and after the barrier. In other words, I/O operations placed before the barrier entry must be completed before the barrier, and I/O operations placed after the barrier entry must be performed after the barrier.) In this example, a header field 402 holds header information of meta-data 400. In response to a write operation from a guest application, an entry for the write operation is appended to the meta-data file 400 at write position 450. A meta-data entry 410 contains a current logical block index 424 and a physical block index 422 of the corresponding memory block, reflecting changes to the LBN-to-PBN mapping. In some embodiments, meta-data entries are run-length encoded. That is, each entry contains a corresponding run length. For example, run-length value 414 indicates the corresponding run length for meta-data entry 410. Zero blocks are optimized in both data and meta-data files, represented by zero block flag 416. At the end of meta-data entry 410 is a series of fields providing block information 412, such as checksums and timestamps 0 to (N-1) for corresponding N non-zero blocks in the potentially unprotected flash storage device exhibiting sub-optimal non-sequential write performance, wherein the blocks correspond to meta-data entry 410. In some embodiments, meta-data entry 410 has a 32 bit Fletcher checksum or Secure Hash Algorithm (SHA)-256 checksum for a respective block.

When the guest kernel of the virtual phone issues a request for an I/O barrier, a barrier entry 440 is appended to meta-data 400. Barrier entry 440 contains a magic entry 442. Barrier entry 440 also contains meta-data checksum 444 of the meta-data entries since the last barrier entry. For example, in FIG. 4, checksum 444 contains a checksum of all entries between barrier entries 430 and 440. Checksum 444 allows the virtual phone to roll back to the last barrier if a missing terminating barrier or corruption of the LBS meta-data is detected. For example, during operation, if an error is detected through checksum 444, the virtual phone can roll back to barrier 430.

I/O Operations of LBS

Figure 5A:
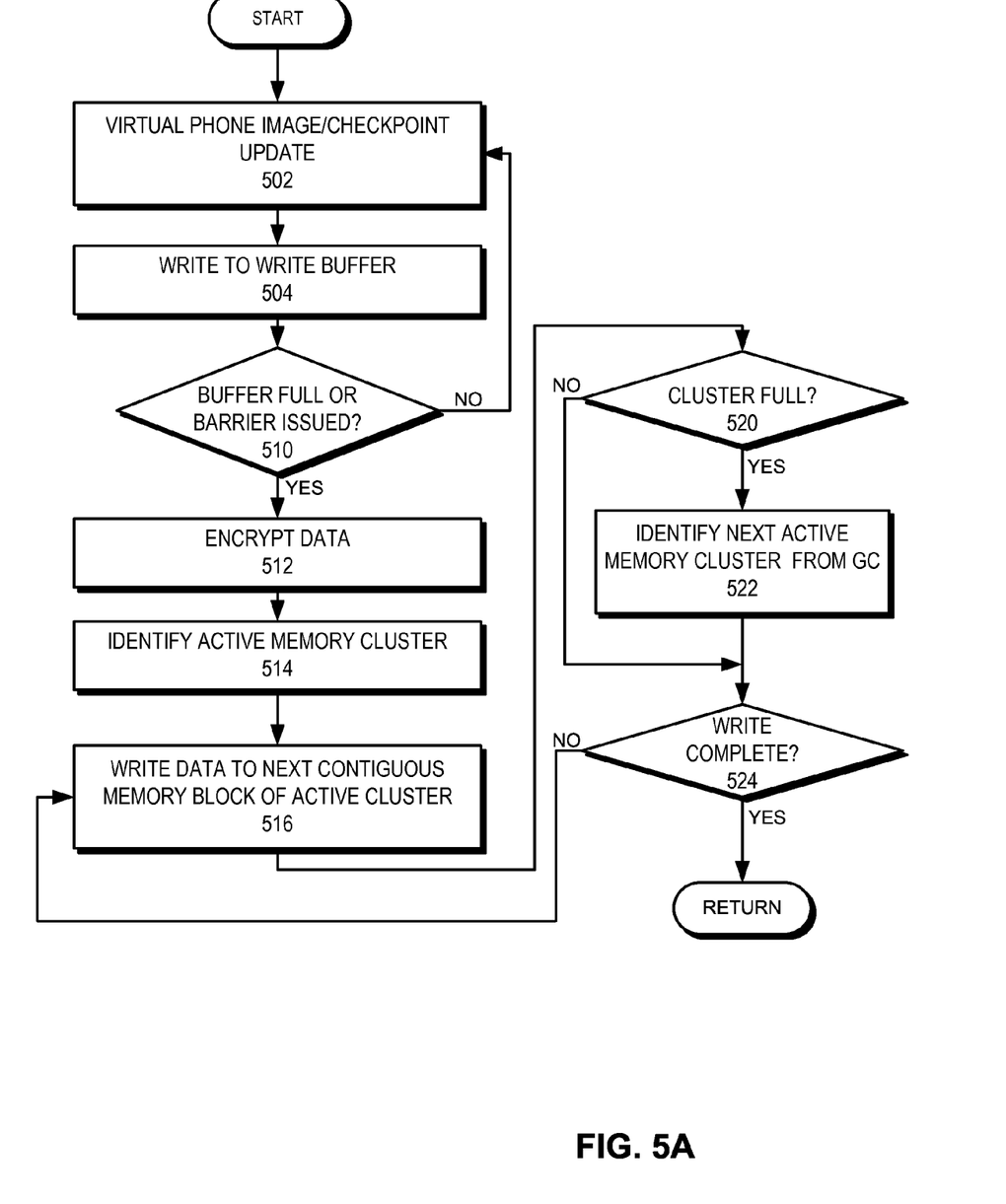
FIG. 5A presents a flowchart illustrating a process of MVP storing LBS data associated with a virtual mobile phone, in accordance with an embodiment of the present invention.

I/O operations on an LBS data file are performed on the potentially unprotected flash storage device exhibiting sub-optimal non-sequential write performance. However, I/O operations on the corresponding LBS meta-data file are performed on the protected storage of the phone. FIG. 5A presents a flowchart illustrating a process of MVP storing LBS data associated with a virtual mobile phone, in accordance with an embodiment of the present invention. Upon an update to the image or checkpoint file of the virtual phone of MVP (operation 502), the VMX storage thread of MVP (e.g., VMX storage thread 202 illustrated in FIG. 2) writes the updated information to a write buffer (operation 504). The update to the image or checkpoint file of the virtual phone (and the corresponding meta-data file) is triggered when a guest operating system executes a write operation (i.e., when the guest operating system writes to its virtual storage, the VMX storage thread redirects the request to the image file). The goal of LBS is to increase the number of sequential writes. The write buffer minimizes write latency and increases the size of sequential writes. In some embodiments, the size of the write buffer is equal to the size of a memory cluster.

The VMX storage thread then checks whether the buffer is full or whether a barrier request was issued by the guest kernel (operation 510). If so, then the buffer is flushed and the content of the buffer is transferred to a potentially unprotected flash storage device exhibiting sub-optimal non-sequential write performance. The data in the buffer is first encrypted (operation 512). Then the VMX storage thread identifies the current active memory cluster (operation 514) and writes data to the next contiguous memory block of the active cluster (operation 516). For example, referring to FIG. 2, VMX storage thread 202 implements LBS 204, and keeps track of active memory clusters and next contiguous memory block. The VMX storage thread then checks if the cluster is full (operation 520). If the cluster is not full, then the VMX storage thread further checks if write operation is complete (operation 524). If the write operation is not complete, the VMX storage thread continues to write to the next contiguous memory block of the active cluster (operation 516). If the cluster is full, the VMX storage thread identifies the next active memory cluster from the garbage collector (operation 522) and proceeds to check whether the write operation is complete (operation 524). The write operation on the flash storage continues until all content of the buffer is transferred (operation 524).

Figure 5B:
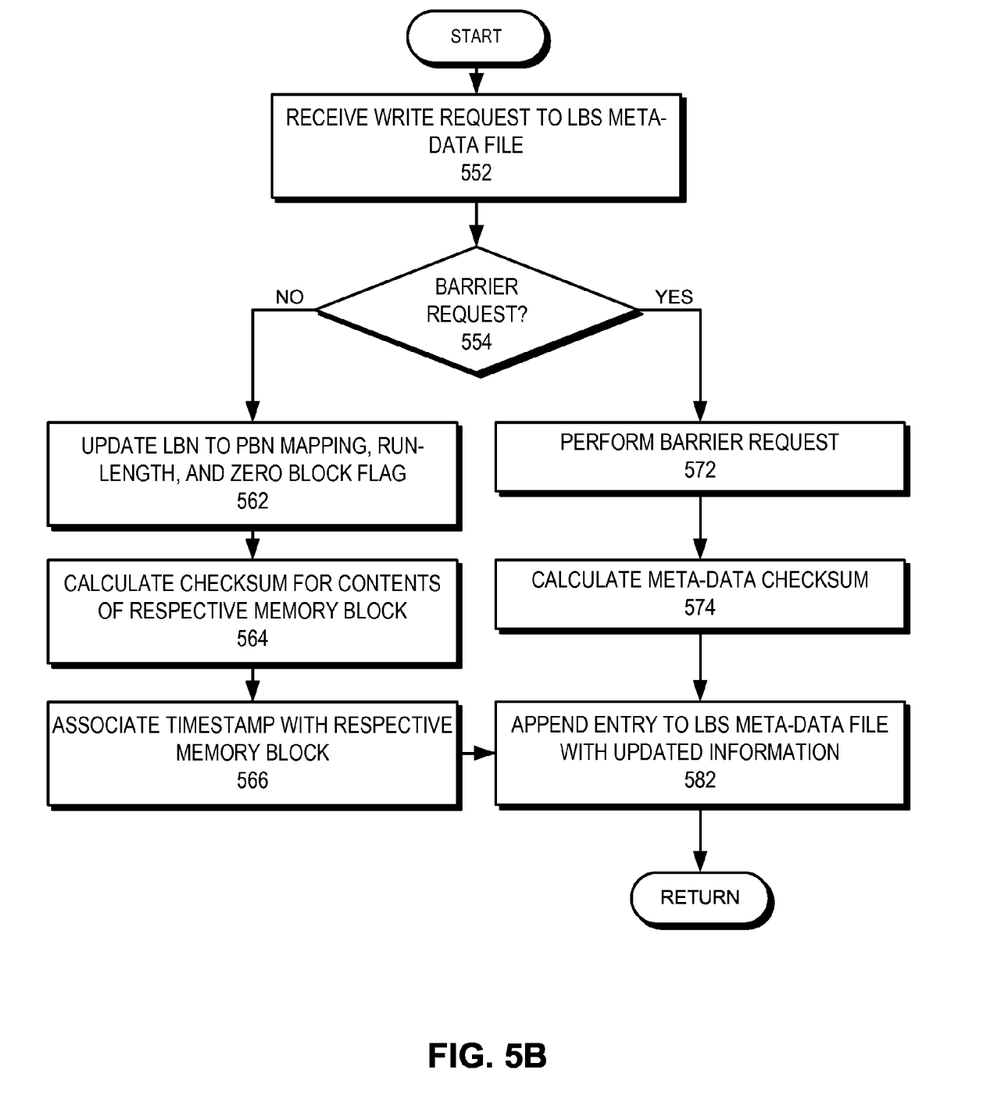
FIG. 5B presents a flowchart illustrating a process of MVP storing LBS meta-data associated with a virtual mobile phone, in accordance with an embodiment of the present invention.

FIG. 5B presents a flowchart illustrating a process of MVP storing LBS meta-data associated with a virtual mobile phone, in accordance with an embodiment of the present invention. Upon receiving a write request to the LBS meta-data file (operation 552), MVP checks if the request is a barrier request (operation 554). If not, then the write operation is associated with a write operation to the flash storage (i.e., the write operation to the LBS meta-data file is triggered by an update to a memory block of the LBS data file). MVP then updates the LBN to PBN mapping, run-length, and zero block flag for the memory blocks to be written on the potentially unprotected flash storage device exhibiting sub-optimal non-sequential write performance (operation 562), as described in conjunction with FIG. 4. MVP calculates a checksum based on the contents of a respective memory block before encryption (operation 564) and associates a timestamp with a respective memory block (operation 566). If the request is for a barrier entry (operation 554), then MVP performs the corresponding barrier request (operation 572) and calculates the meta-data checksum of all entries since the previous barrier entry (operation 574), as described in conjunction with FIG. 4. When the entry is ready for writing to the meta-data file (after operation 566 or 574), MVP appends the entry to the LBS meta-data file with updated information (operation 582).

Garbage Collection

In some embodiments, garbage collection takes place in a thread separate from the main storage thread. The garbage collector thread selects clusters to free based on the "emptiness" of a cluster, i.e. the number of unoccupied blocks in the cluster. Furthermore, the garbage collector thread selects clusters to free based on a score assigned to the cluster. It is desirable to minimize the number of non-sequential jumps in the write position, even when write buffering and achieving sequential access within a cluster. A combination of factors is used for scoring a respective cluster. The garbage collector frees contiguous clusters that have the highest scores. In some embodiments, the scoring function has four weighted components:

Emptiness: A cluster with more free blocks is given a higher score. The score can be calculated based on the number of unoccupied blocks divided by blocks-per-cluster.

Left empty: A cluster with an empty left adjacent cluster is given a high score because it is desirable to have as many contiguous free clusters as possible. Since most I/O operations are ascending, the right adjacent cluster is likely to be considered during a write operation.

Outlier correction: A clusters with a substantially higher number of occupied blocks compared to the adjacent clusters is given a high score. This outlier cluster is favored by treating the cluster as if it were almost as empty as its adjacent clusters.

Write position: A cluster next to the cluster currently being written is given a high score. This promotes contiguous writes.

Figure 6A:
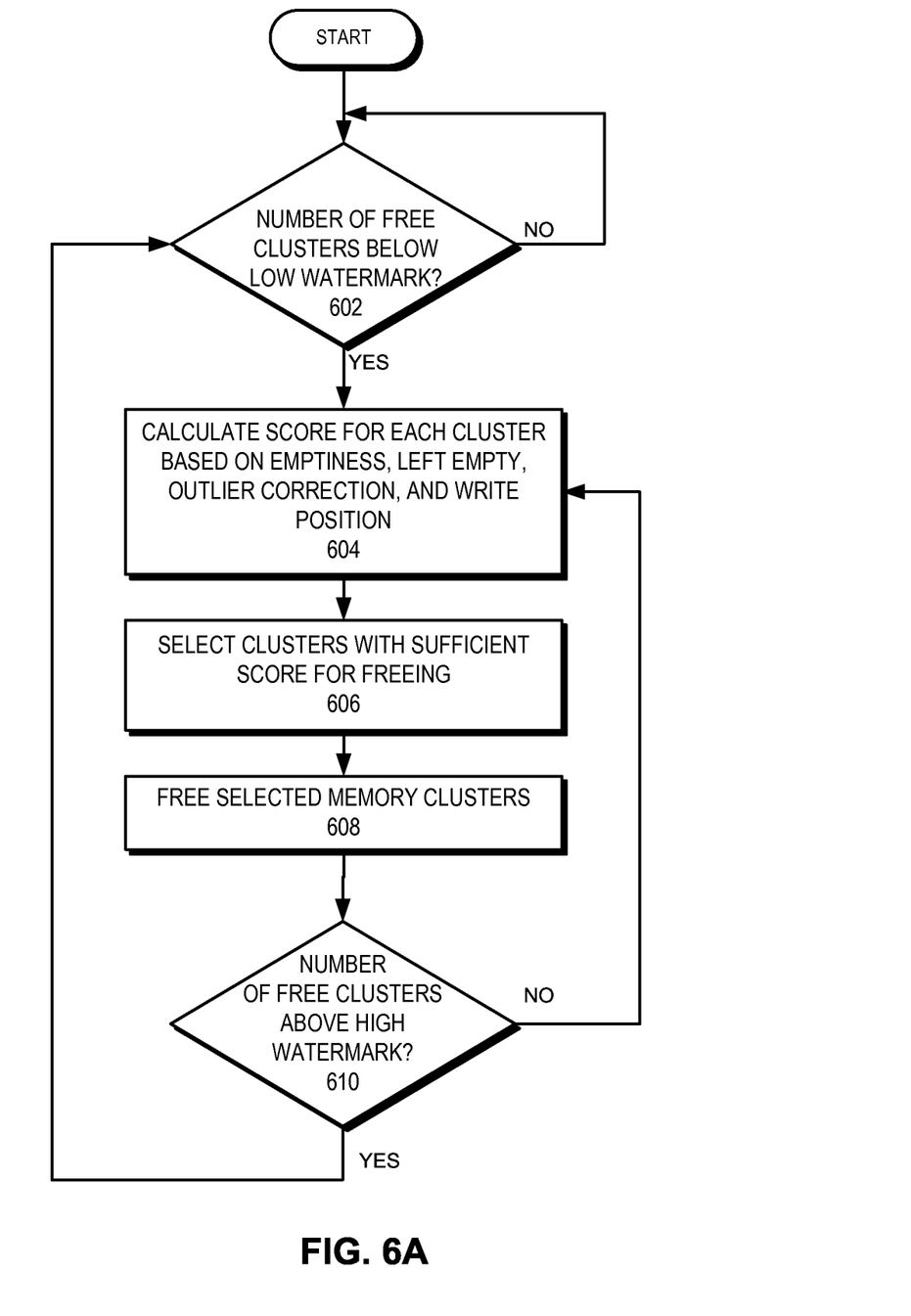
FIG. 6A presents a flowchart illustrating a process of MVP freeing storage for LBS data in a potentially unprotected flash storage device exhibiting sub-optimal non-sequential write performance, in accordance with an embodiment of the present invention.

FIG. 6A presents a flowchart illustrating a process of MVP freeing storage for LBS data in a potentially unprotected flash storage device exhibiting sub-optimal non-sequential write performance, in accordance with an embodiment of the present invention. In some embodiments, MVP dedicates a thread for garbage collection. Garbage collection starts when the number of free clusters drops below a low watermark and stops when the number of free clusters climbs back up above a high watermark. Hence, MVP first checks whether the number of free clusters is below the low watermark (operation 602). If not, MVP continues to check; otherwise, the garbage collection process begins. MVP first calculates a score for each cluster based on emptiness, left empty, outlier correction, and write position (operation 604). MVP then selects clusters with a sufficient score for freeing (operation 606). In some embodiments, MVP selects a cluster for garbage collection when the score for the cluster is more than a threshold value. MVP then frees the selected memory clusters (operation 608). For example, in FIG. 3B, garbage collection process can free cluster 330 to provide contiguous memory cluster to active cluster 320. Next, MVP determines whether the number of free clusters has climbed back up above a high watermark (operation 610). If so, MVP continues to check whether the number of free clusters is below the low watermark (operation 602). If not, MVP continues the garbage collection process (operation 604).

Figure 6B:
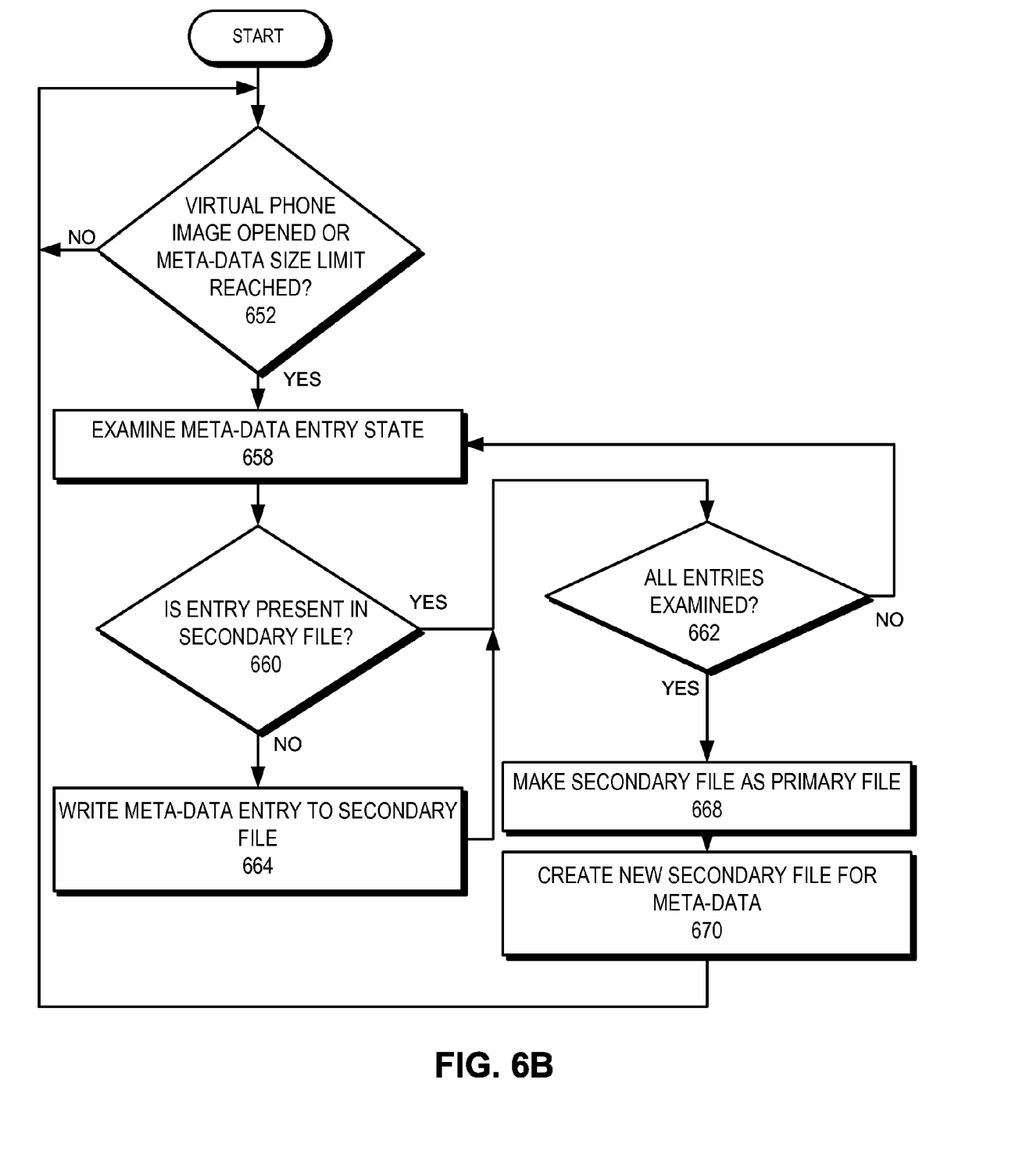
FIG. 6B presents a flowchart illustrating a process of MVP freeing storage for LBS meta-data in the protected storage of a phone, in accordance with an embodiment of the present invention.

FIG. 6B presents a flowchart illustrating a process of MVP freeing storage for LBS meta-data in the protected storage of a phone, in accordance with an embodiment of the present invention. The meta-data file is not garbage collected online. Instead, when a virtual phone image associated with MVP is opened or when the size of the LBS meta-data file reaches a fixed limit (operation 652), an atomic update is performed offline to eliminate stale entries. At any point in time, there exist up to two meta-data files in use by MVP, a primary and a secondary. MVP only writes to the secondary file. When a virtual phone image is opened, an empty secondary metadata file is created (if it does not already exist on the file system). Both primary and secondary meta-data files are read into an in-memory representation of meta-data state. Subsequently, MVP performs garbage collection of the meta-data. MVP then examines an entry in the in-memory representation of the meta-data (operation 658) and determines whether it is present in the secondary meta-data (operation 660). If not, the entry is appended to the secondary file (operation 664). Otherwise, the entry is skipped. MVP then checks whether all entries in the in-memory meta-data have been examined (operation 662). If all entries have not been examined, MVP continues to examine entries in the in-memory meta-data (operation 658). When all entries have been examined, MVP makes the secondary file into the primary LBS meta-data file (operation 668). In some embodiments, the secondary meta-data file is renamed into the primary meta-data file. A new secondary meta-data file is then created, where all future meta-data file updates will occur (operation 670). Note that MVP also performs the above garbage collection when the meta-data file reaches a predetermined size.

Reliability

There are several possible failure scenarios for a virtual phone. For example, when the host of the virtual phone crashes due to battery depletion, software bugs or other causes, the data or meta-data file may face corruption, or the write buffer contents can be lost. Furthermore, when a NAND device (a potentially unprotected flash storage device exhibiting sub-optimal non-sequential write performance), such as an SD card, or protected storage, such as a storage with a secure file system) fails, the files can become corrupt.

Because MVP is hosted on a host operating system, MVP relies on the guarantees provided by the underlying file systems of the host operating system for protection against meta-data corruption. The robustness of the protected storage provides protection to the LBS meta-data file. However, an LBS data file on a potentially unprotected flash storage device exhibiting sub-optimal non-sequential write performance can be prone to crash. A corruption to the data file is detectable through the use of checksums on both the LBS data, and the checksum stored in the corresponding meta-data entry. Barrier entries in the meta-data contain a checksum of the meta-data entries since the last barrier entry. In this way, if a missing terminating barrier or corruption of the LBS meta-data is detected, it is possible to roll back to the last barrier during recovery. Furthermore, LBS ensures that internal write buffers are flushed and that synchronization is performed on first the LBS data file and then the meta-data file on a barrier operation from the guest kernel to manage any loss to the content of the write buffer.

When a garbage collection is performed on the meta-data file, there is a possibility of failure due to a host crash. To reduce the likelihood of this failure, MVP writes to a second meta-data file and only when the garbage collection is complete is the second file assigned as the current meta-data file.

There are existent error detection mechanisms within the FTLs for both the protected storage and the potentially unprotected flash storage device exhibiting sub-optimal non-sequential write performance. However, a malicious attacker may modify memory blocks in the unprotected flash storage and produce symptoms similar to media failure from the point-of-view of the LBS of MVP. But the FTL on the SD card regards the modification as a legitimate write operation and cannot detect the symptoms. The checksums provide an additional mechanism to detect actual media failure and guard against such malicious attacks.

Security

There are two classes of attacks that can be considered as the most relevant to a virtual phone. The first class of attack is physical attacks, where the confidentiality of any data associated with a virtual phone is compromised when the physical phone or an external unprotected storage (e.g., an SD card) is lost or stolen. The other class of attack is done by malicious applications. These malicious applications compromise the confidentiality or integrity of the virtual phone image by exploiting weaknesses in the host OS, either while the virtual phone is running or when it is suspended.

As the LBS data file is encrypted at block granularity, if an SD card or phone is stolen, there is no plaintext on the storage media available to an attacker. Furthermore, this encryption ensures that the malicious applications may not learn the contents of the LBS data file. However, encryption alone does not directly protect against replay and randomization attacks. A replay attack occurs when a legitimate encrypted block from the past is reintroduced in the LBS data file by a malicious application, causing the virtual phone behavior to be influenced by the contents of the injected block. The attacker does not need to know the plaintext contents of the block. Only the associated guest behavior with the block that has been previously observed is sufficient for the malicious application to launch the replay attack. A randomization attack occurs when a block is intentionally corrupted by a malicious application. This corruption leads guest applications or the guest kernel to behave outside the usual control envelope where they depend on the contents of the block.

The timestamp and checksum in the LBS meta-data associated with a respective memory block combat replay and randomization attacks, respectively. In some embodiments, MVP maintains a logical clock for timestamps, and the timestamp for a respective memory block is incremented after each write. As an older block is associated with an older timestamp, an older block cannot be reintroduced and a reply attack is thus prevented. A checksum is calculated on the content of a memory block before encryption. The resultant checksum is hidden from the attacker as the checksum resides in the LBS meta-data, which is protected by the permissions of the native operating system. Hence, when attempting a randomization attack, the attacker is limited by a lack of knowledge of the checksum of a memory block. In some embodiments, the checksum selection is configurable and can be based on a Fletcher-32 or truncated SHA-256 checksum.

System Architecture

Figure 7:
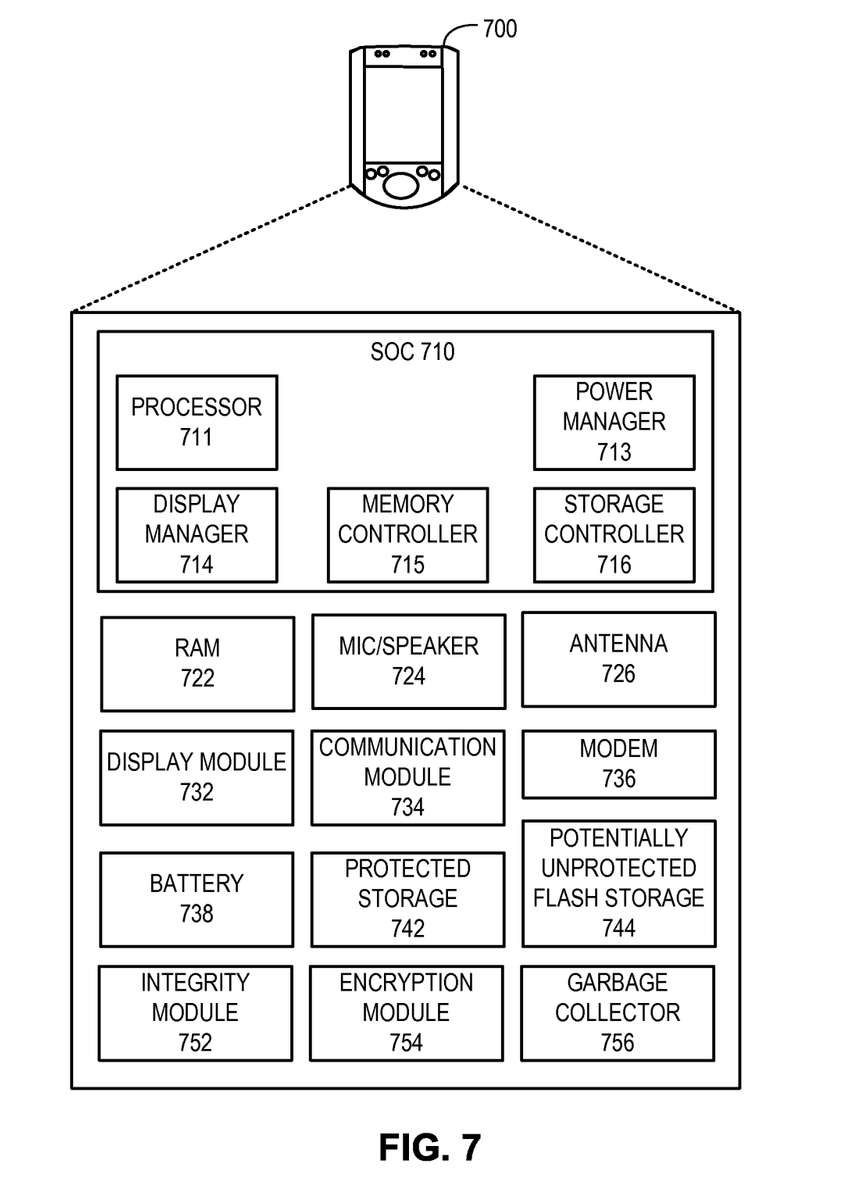
FIG. 7 illustrates an exemplary architecture of a system with LBS support, in accordance with an embodiment of the present invention.

FIG. 7 illustrates an exemplary architecture of a system with LBS support, in accordance with an embodiment of the present invention. System 700 includes a SoC 710 that provides the basic functionality to the system. In some embodiments, system 700 is a mobile phone. SoC 710 includes a processor 711 that executes the operations of system 700. Power manager 713 controls battery 738. Display manager 714 controls display module 732 and provides display to a user. In some embodiment, display module includes a liquid crystal display (LCD). Memory controller 715 allows processor 711 to access random access memory (RAM) 722. Storage controller 716 provides accesses to protected and potentially unprotected flash storage device exhibiting sub-optimal non-sequential write performance of system 700.

Microphone/speaker module 724 allows a user to perform regular voice operations. Communication module 724 uses antenna 726 and modem 736 to connect to a telephone network. System 700 includes a protected storage 742 and a potentially unprotected flash storage device 744 exhibiting sub-optimal non-sequential write performance. In some embodiments, protected storage 742 can be a NAND flash memory chip. In some further embodiments, protected storage 742 can be an eMMC or an eSD card with a secured file system, such as ext3. Integrity module 752 performs integrity checks on NAND flash 742 and potentially unprotected flash storage 744. Encryption module 754 encrypts memory blocks on NAND flash 742 and potentially unprotected flash storage 744. Garbage collector 756 frees memory blocks and makes them available for writes.

Note that the above-mentioned modules can be implemented in hardware as well as in software. In some embodiments, one or more of these modules can be embodied in computer-executable instructions stored in a memory which is coupled to one or more processors in system 700. When executed, these instructions cause the processor(s) to perform the aforementioned functions.

In summary, embodiments of the present invention provide a system and a method for storing data in contiguous memory blocks in a potentially unprotected flash storage device exhibiting sub-optimal non-sequential write performance of a mobile phone and corresponding meta-data in a protected storage of the phone to ensure performance, reliability, and security. In one embodiment, during operation, the system stores in the flash storage data in a log-structured format and in a protected storage meta-data associated with the data stored in the flash storage. The system also checks integrity of the data stored in the flash storage using the meta-data in the protected storage.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer executable method comprising:
storing, by a first driver implemented in a computer, data in a log-structured format in a first file system, wherein the first file system comprises a plurality of memory clusters, each memory cluster comprising a plurality of contiguous memory blocks, and
wherein the storing comprises:
writing sequentially to each of the contiguous memory blocks in a first memory cluster;
determining that the first memory cluster is full; and
responsive to the determining, selecting a second memory cluster and writing sequentially to each of the contiguous memory blocks in the second memory cluster;
storing in a second file system, by a second driver implemented in the computer, meta-data associated with the data stored in the first file system, wherein the meta-data comprises a plurality of entries, including a first meta-data entry and a second meta-data entry, the first meta-data entry corresponding to the first memory cluster containing data stored in the log-structured format by the first driver and the second meta-data entry corresponding to the second memory cluster containing data stored in the log-structured format by the first driver; and
checking integrity of the data stored in the first file system using the meta-data in the second file system, wherein the first and second file systems are different file systems.

2. The method of claim 1, wherein the computer is a mobile device.

3. The method of claim 1, wherein file systems of the first file system and the second file system are of different types, and the file system of the second file system is a secure file system.

4. The method of claim 1, wherein the data stored in the first file system contains an image of a virtual machine.

5. The method of claim 1, wherein the first file system is implemented in a Secure Digital (SD) card and the second file system is implemented in a different file system device.

6. The method of claim 1, further comprising storing in a write buffer write data to be written in the first file system.

7. The method of claim 1, further comprising:
calculating a checksum based on data in a memory block in the first file system; and
storing the checksum in the meta-data associated with the memory block,
wherein the checksum of the memory block is used in checking the integrity of the data stored in the memory block of the first file system.

8. The method of claim 7, wherein the checksum is calculated based on unencrypted data.

9. The method of claim 1, further comprising:
associating a timestamp with a write operation on a memory block in the first file system; and storing the timestamp in the meta-data associated with the memory block,
wherein the timestamp associated with the write operation on the memory block is used in checking the integrity of the data stored in the memory block of the first file system.

10. The method of claim 1, further comprising encrypting a memory block in the first file system.

11. The method of claim 1, further comprising appending new meta-data to the existing meta-data in a contiguous fashion.

12. The method of claim 1, further comprising storing the data in the first file system in one or more clusters, a respective cluster comprising a predetermined number of memory blocks, wherein garbage collection in the first file system is performed in units of a cluster.

13. The method of claim 12, further comprising removing stale meta-data from the second file system in response to the meta-data reaching a predetermined length or the data in the first file system corresponding to the meta-data being opened.

14. The method of claim 12, further comprising freeing a memory cluster in the first file system, wherein the memory cluster is selected based on one or more of the following:
the memory cluster being marked as unused in its associated meta-data;
a number of available memory blocks in the memory cluster;
availability of an adjacent writable memory cluster;
a write operation on a previous memory cluster; and
a high number of unavailable memory blocks in the memory cluster compared with a plurality of nearby memory clusters.

15. A computer-readable non-transitory storage device storing instructions that when executed by a computer cause the computer to perform a method, the method comprising:
storing data in a log-structured format in memory blocks of a first file system using a first driver;
storing in a second file system meta-data associated with the data stored in the first file system using a second driver, wherein the meta-data comprises a plurality of entries, including a first meta-data entry and a second meta-data entry, the first meta-data entry corresponding to a first set of memory blocks that are contiguous in the first file system and contain data stored in the log-structured format using the first driver, and the second meta-data entry corresponding to a second set of memory blocks that are contiguous in the first file system and contain data stored in the log-structured format using the first driver; and
checking integrity of the data stored in the first file system using the meta-data in the second file system, wherein the first and second file systems are different file systems.

16. The storage device of claim 15, wherein the computer is a mobile device.

17. The storage device of claim 15, wherein file systems of the first file system and the second file system are of different types, and the file system of the second file system is a secure file system.

18. The storage device of claim 15, wherein the data stored in the first file system contains an image of a virtual machine.

19. The storage device of claim 15, wherein the first file system is implemented in a Secure Digital (SD) card and the second file system is implemented in a different file system device.

20. The storage device of claim 15, wherein the method further comprises storing in a write buffer write data to be written in the first file system.

21. The storage device of claim 15, wherein the method further comprises:
calculating a checksum based on data in a memory block in the first file system; and storing the checksum in the meta-data associated with the memory block,
wherein the checksum of the memory block is used in checking the integrity of the data stored in the memory block of the first file system.

22. The storage device of claim 21, wherein the checksum is calculated based on unencrypted data.

23. The storage device of claim 15, wherein the method further comprises:
associating a timestamp with a write operation on a memory block in the first file system; and
storing the timestamp in the meta-data associated with the memory block,
wherein the timestamp associated with the write operation on the memory block is used in checking the integrity of the data stored in the memory block of the first file system.

24. The storage device of claim 15, wherein the method further comprises encrypting a memory block in the first file system.

25. The storage device of claim 15, wherein the method further comprises appending new meta-data to the existing meta-data in a contiguous fashion.

26. The storage device of claim 15, wherein the method further comprises storing the data in the first file system in one or more clusters, a respective cluster comprising a predetermined number of memory blocks, wherein garbage collection in the first file system is performed in units of a cluster.

27. The storage device of claim 26, wherein the method further comprises removing stale meta-data from the second file system in response to the meta-data reaching a predetermined length or the data in the first file system corresponding to the meta-data is opened.

28. The storage device of claim 26, wherein the method further comprises freeing a memory cluster in the first file system, wherein the memory cluster is selected based on one or more of the following:
the memory cluster being marked as unused in its associated meta-data;
a number of available memory blocks in the memory cluster;
availability of an adjacent writable memory cluster;
a write operation on a previous memory cluster; and
a high number of unavailable memory blocks in the memory cluster compared with a plurality of nearby memory clusters.

29. A computer system comprising:
a first file system storing data in a log-structured format using a first driver;
a second file system storing meta-data associated with the data stored in the first file system using a second driver, wherein the meta-data comprises a plurality of entries, including a first meta-data entry and a second meta-data entry, the first meta-data entry corresponding to a first set of memory blocks that are contiguous in the first file system and contain data stored in the log-structured format using the first driver, and the second meta-data entry corresponding to a second set of memory blocks that are contiguous in the first file system and contain data stored in the log-structured format using the first driver; and an integrity checking mechanism configured to check integrity of the data stored in the first file system using the meta-data in the second file system, wherein the first and second file systems are different file systems.

30. The computer system of claim 29, wherein computer system is a mobile device.

31. The computer system of claim 29, wherein the data stored in the first file system contains an image of a virtual machine.

32. The computer system of claim 29, wherein the first file system is implemented in a Secure Digital (SD) card and the second file system is implemented in a different file system device.

33. The computer system of claim 29, wherein file systems of the first file system and the second file system are of different types, and the file system of the second file system is a secure file system.

34. The computer system of claim 29, wherein the data are stored in the first file system in the log-structured format in one or more clusters, a respective cluster comprising a predetermined number of memory blocks, and garbage collection in the first file system is performed in units of a cluster.

* * * * *